United States Patent [19]
Donnan

[11] Patent Number: 5,666,546
[45] Date of Patent: Sep. 9, 1997

[54] METHOD OF MANAGING CONCURRENT ACCESSES TO A MEMORY BY A PLURALITY OF USERS USING ATOMIC INSTRUCTIONS TO PREVENT READ/WRITE ERRORS

[75] Inventor: Gary Donnan, Oysonville, France

[73] Assignee: Alcatel Alsthom Compagnie Generale d'Electricite, Paris Cedex, France

[21] Appl. No.: 260,734

[22] Filed: Jun. 15, 1994

[30] Foreign Application Priority Data

Jun. 17, 1993 [FR] France .................. 93 07315

[51] Int. Cl.⁶ .................................................. G06F 15/00
[52] U.S. Cl. ................. 395/472; 395/376; 395/608; 395/726; 395/200.43; 395/200.45; 711/141; 711/145
[58] Field of Search ............... 395/800, 200.08, 395/550, 500, 650, 375, 376, 608, 468, 472, 726

[56] References Cited

U.S. PATENT DOCUMENTS

| | | | |
|---|---|---|---|
| 5,093,912 | 3/1992 | Dong et al. | 395/650 |
| 5,333,297 | 7/1994 | Lemaire et al. | 395/500 |
| 5,434,995 | 7/1995 | Oberlin et al. | 395/550 |
| 5,440,698 | 8/1995 | Sindhu et al. | 395/200.08 |

OTHER PUBLICATIONS

Maurice Herlihy, "Wait–Free Synchronization", ACM Transactions on Programming Languages and Systems, vol. 11, No. 1, Jan. 1991, pp. 124–149.

Magnusson et al., "Queue Locks . . . Multiprocessors", Apr. 1994, pp. 165–171.

Bershad, "Practical Considerations . . . Objects", May 1993, pp. 264–273.

Lamport, "The Mutual . . . Solutions", Apr. 1986, pp. 327–348.

Bob Reims, "Multiprocessing Capabilities of the MC68020 32–bit Processors", Wescon Technical Papers, Oct. 30, 1984, , , p. 1016.

"Microprocessor and Peripheral Handbook, vol. I, Microprocessors", Intel.

"386 DX Microprocessors Programmer's Reference Manual", Intel, 1990, pp. 17–182.

R. D. Dowsing et al, "Programming a Bounded Buffer Using the Object and Path Expression Constructs of Path Pascal", Computer Journal, vol. 29, No. 5, 1986, pp. 423–429.

Primary Examiner—Alyssa H. Bowler
Assistant Examiner—John Follansbee
Attorney, Agent, or Firm—Sughrue, Mion, Zinn, Macpeak & Seas

[57] ABSTRACT

A method of managing concurrent accesses by a plurality of users to a memory, for reading or writing data in memory zones of the memory on the basis of an index whose value identifies a memory zone in the memory, includes the steps of: recording the value of the index in a first memory register; summing the contents of the first memory register with an increment value; recording the result of the summing operation in a second memory register; atomically interchanging the index value with the contents of the second memory register; and taking the content of the first memory register as the current value of the index if the contents of the second memory register is identical to the old value of the index, otherwise performing each of the preceding steps again.

3 Claims, 2 Drawing Sheets

METHOD OF MANAGING CONCURRENT ACCESSES TO A MEMORY BY A PLURALITY OF USERS USING ATOMIC INSTRUCTIONS TO PREVENT READ/WRITE ERRORS

The invention relates to a method of managing concurrent accesses to a common memory 1 by a plurality of users 2 all sharing the processing time of a data processor 3, each user causing said processor to perform a sequence of instructions 4 for reading or writing data in memory zones 5 of said memory on the basis of an index having a value that identifies a memory zone in said memory.

BACKGROUND OF THE INVENTION

An analogous method, for a multiprocessor architecture, is known from the technical bulletin of Digital Equipment Corporation dated Oct. 2, 1991 and entitled "A methodology for implementing highly concurrent data objects". Its main purpose is to manage concurrent accesses to a memory by a plurality of processors in a fault-tolerant context. The invention relates more particularly to a method of managing concurrent accesses to a memory by a plurality of activities (referred to as "threads") in a single-processor context.

This type of multi-thread processing serves to manage very fast interchanges of data between asynchronous tasks that transmit and receive such data. Each data item transmitted by a task is picked up by a thread that records it in a zone of the memory identified by the value of a write index. When a task requires a data item, a thread proceeds to read a data item from the memory zone identified by a read index. At each read or write stage in the memory, the read index or the write index is updated for the next read or write operation.

The main problem in using a memory that is shared between a plurality of concurrent threads is ensuring the integrity of the data interchanged between the threads. This problem can be presented as follows.

A thread A begins to write data into a memory zone identified by the write index.

Shortly thereafter, a thread B begins to write data into the same memory zone, even though the write index has not been updated in the meanwhile.

This gives rise to mixed-up data belonging to both threads A and B, since neither of those two threads has been able to use the memory for its own account only.

If ever a thread C reads from that memory zone, then it will recover data that is incoherent relative to the write operations of threads A and B.

A solution known from the above-mentioned document is to ensure that each user of the memory reads or writes a data item into a memory zone by causing an atomic sequence of instructions to be performed, i.e. a sequence of instructions that cannot be interrupted by any other user.

In that document, the sequence of instructions makes use of an operation for setting a latch, and if successful, it enables the user who has set the latch to have exclusive access to the memory until that user releases the latch. One possible implementation of setting and releasing a latch by applying instructions of the "store-conditional" type and of the "load-linked" type is described in the above-mentioned document. While a user has exclusive access to the memory, other users in waiting seek to gain access to the memory.

The drawbacks of such a method are as follows.

If the user who has set the latch goes into a loop, then all the other users waiting for access to the memory are blocked. Further, if the users who share the memory are operating in a real time context, then the execution time of a sequence of instructions used by one of the users for accessing the memory can exceed the response time imposed on other users which share access to that memory. As result, that known method is unsuitable for real time processing.

In that known method, the atomic sequence of instructions performed by a processor on behalf of a user includes operations of reading or writing data in a zone of the memory. That atomic instruction sequence is referred to as a "critical section".

OBJECT AND SUMMARY OF THE INVENTION

The object of the invention is to minimize the size of said critical section so as to avoid the phenomenon of users waiting for access to the memory being blocked in the context of a single-processor architecture.

To this end, the invention provides a method of managing concurrent accesses to a memory by a plurality of users, wherein it implements the following operations in order in said sequence of instructions:

a) the value of the index is recorded in a first memory register;

b) the contents of the first memory register is summed with an increment value;

c) the result of the summing operation is recorded in a second memory register;

d) the index value is interchanged atomically with the contents of the second register;

e) if the contents of the second memory register is identical to the contents of the first register, then the content of the first register is taken as the current value of the index, otherwise operations a), b), c), d), and e) are performed again.

Unlike the known method, the critical section is limited to operation d) of updating the index. The operations whereby a user writes to or reads from the memory are implemented outside the critical section. Faults of the free memory zone or of the busy memory zone can therefore be handled by each user outside the critical section.

The method of the invention does not include any explicit latching if the atomic permutation can be performed by a single instruction of the processor. One such instruction is the "SWAP" instruction of the "SPARC" processor from "Cypress Semiconductors".

Memory management is facilitated if the summing in operation b) is performed modulo the size of the memory.

BRIEF DESCRIPTION OF THE DRAWING

The invention is now described in detail below with reference to.

MORE DETAILED DESCRIPTION

Figure 2:
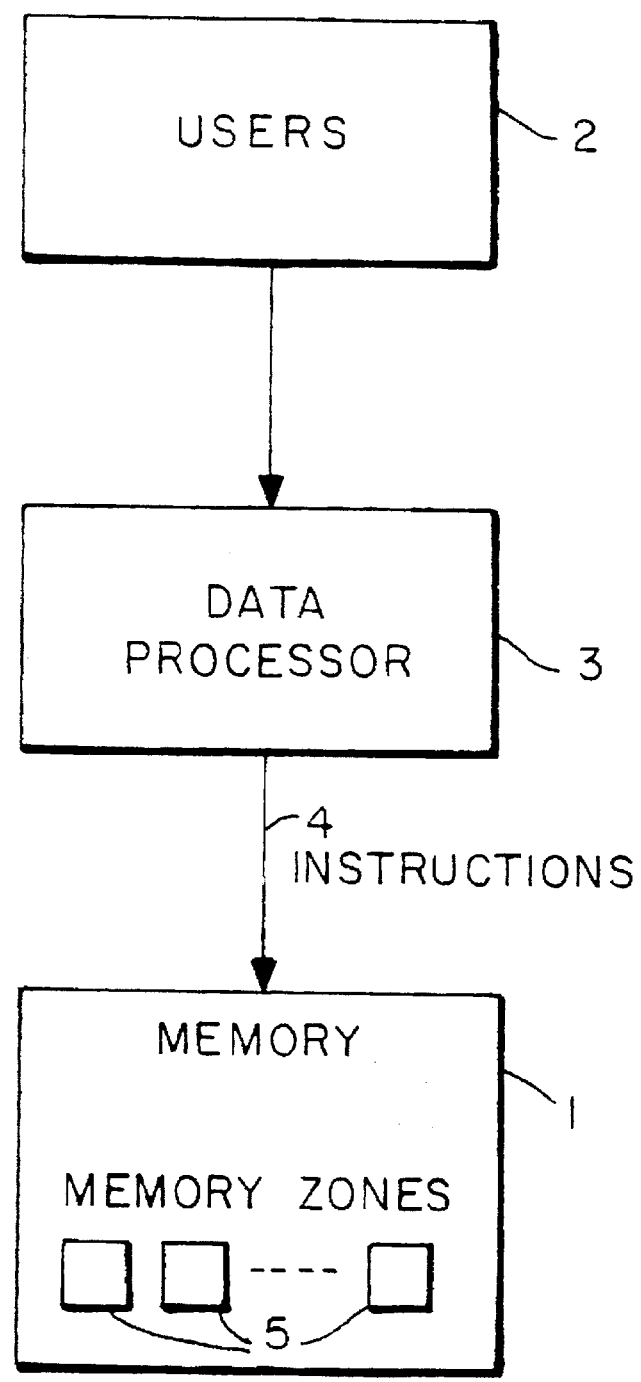
FIG. 2 which is a block diagram of a memory, a data processor, and users.

It is assumed below that the memory is a cyclic buffer having a fixed number N of memory zones of fixed size. Read/write accesses to the memory are managed by means of a write index E and a read index L that is independent of the index E, with the value of each of the two indices identifying an address (number 1 to N) in a memory zone of said memory (see FIG. 2). Cyclic buffers are well known and are not described in greater detail. Nevertheless, it will be understood that the users of the memory share both of the indices L and E. In addition, the cyclic operation of the buffer causes the value of each index to advance by a fixed step size, e.g. 1, and whenever an index reaches N, it returns to 1. This thus constitutes modulo-N summing.

Figure 1:
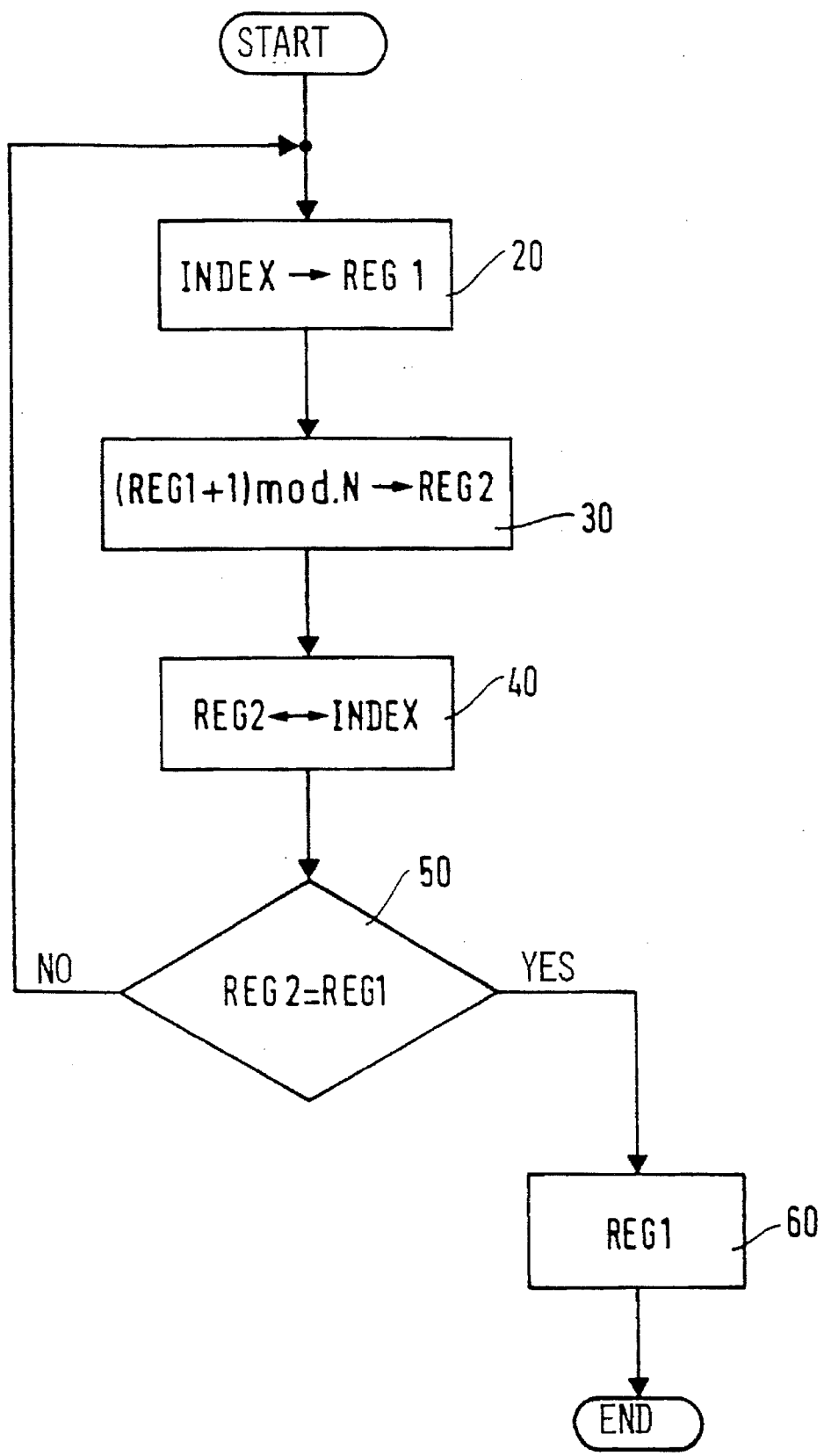
FIG. 1 which is a flow chart showing the operations implemented in the sequence of instructions of the method of the invention.

With reference now to FIG. 1, the sequence of instructions enabling a user, such as a thread, to access the memory, implements the following operations.

a) Storing, at 20, the current value of the index (index L or index E as appropriate) in a first register Reg1;

b) then summing, at 30, the contents of the first register Reg1 with an increment value, preferably unity, modulo the size N of the memory; and c) still at 30, putting the result of the summing performed in the above operation into a second register Reg2;

d) then, at 40, atomically interchanging the value of the index with the contents of the second register Reg2; and e) at 50, if the contents of the second register Reg2 is identical to the contents of the first register Reg1, then, at 60, taking the value contained in the first memory register Reg1 as the current value of the index, otherwise starting the preceding operations over from block 20.

An example of a sequence of instructions for implementing operations a) to e) is given below. These instructions form a part of the set of instructions that are available on the "SPARC" processor and they appear in the work "SPARC Instruction Set" published by "Cypress Semiconductor".

In this example, "ModulatomAdd" is the name of a software function that returns the current value of an index and that updates the value of said index.

The input arguments of this function are as follows:

the index as designated by the letter "i";

the index increment as designated by the letter "j"; and the size of the memory in terms of the number N of memory zones as designated by "mod".

```
ModuloatomAdd (i, j, mod)
int j, *i, mod;
int reg1, reg2;{
do {
        reg1 = *i;
        reg2 = (reg1 + j) & mod;
        reg2 = swap (i, reg2);
        j = reg2 − reg1;
    } while (j! = 0);
    return reg1;
}
```

The critical section includes the single instruction "swap" of the "SPARC" processor. The size of the memory as a number of memory zones must be selected as a function of the number of read and write accesses to said memory per unit time. Problems of memory overflow can be dealt with by adding additional memory zones that are chained to one another by conventional address pointers, so as to extend the capacity of the memory dynamically. Clearly, after a current index value has been recovered, each thread must check that the memory zone identified by said current index value corresponds to a free zone or to an occupied zone, as the case may be, in the memory prior to performing a read operation or a write operation in said memory zone.

I claim:

1. A method of managing concurrent accesses to a memory by a plurality of users sharing the processing time of a data processor so that each of them can cause a sequence of instructions to be performed by said processor for the purpose of reading or writing data in memory zones of said memory on the basis of an index whose value identifies a memory zone in said memory, wherein the following sequence of operations is implemented in order in said sequence of instructions:

a) the value of the index is recorded in a first memory register;

b) the contents of the first memory register is summed with an increment value;

c) the result of the summing operation is recorded in a second memory register;

d) the index value is interchanged atomically with the contents of the second memory register;

e) if the contents of the second memory register is identical to the old value of the index, then the content of the first memory register is taken as the current value of the index, otherwise operations a), b), c), d), and e) are performed again.

2. A method according to claim 1, in which the atomic interchange is performed by a single instruction of the processor.

3. A method according to claim 1, in which the memory includes N memory zones and the summing in operation b) is performed modulo N.

* * * * *